United States Patent Office 3,482,360
Patented Dec. 9, 1969

3,482,360
ULTRASONIC MACHINING APPARATUS
Percy Legge, Wantage, England, assignor to United Kingdom Atomic Energy Authority, London, England
Filed Jan. 9, 1967, Ser. No. 607,995
Claims priority, application Great Britain, Mar. 16, 1966, 11,599/66
Int. Cl. B24b 49/00, 51/00; B23b 47/00
U.S. Cl. 51—165                            10 Claims

ABSTRACT OF THE DISCLOSURE

An ultrasonic machining apparatus providing an abrasive impregnated tool, an ultrasonic generator to activate the tool, means for rotating the tool relative to a workpiece and means to feed the tool towards the workpiece at a rate proportional to the rate of material removal from the workpiece.

---

Figure 1:
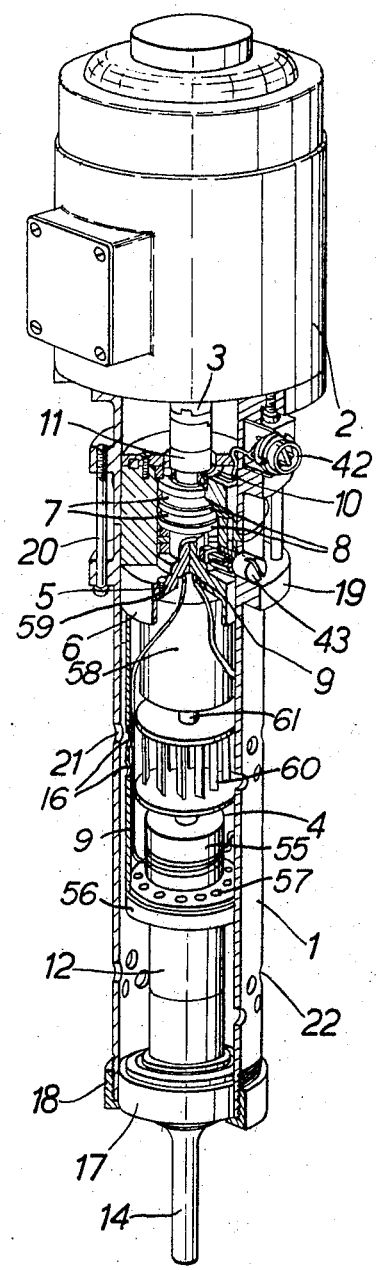

This invention relates to the ultrasonic machining of hard materials, for example ceramics, and to apparatus therefor.

Forms of ultrasonic machining apparatus are described in British patent specification No. 987,801. In the apparatus described the rate of tool feed was determined by the addition or removal of weights from a counter balance, opposing the movement of the machining load. The weight changing technique has proved satisfactory but involves the use of a large selection of weights to provide the sensitivity required to cover the range of tool diameters. For example, operating experience has shown that there is a definite link between the ultrasonic power output and the rate of feed on the tool. If the rate of removal of material exceeds the rate of feed, unstable conditions result in chatter on the tool. If on the other hand the feed rate is in excess to the cutting or grinding efficiency of the ultrasonic power output which governs the amplitude of the transducer, the grinding action tends to cease together with the resonance to the transducer head due to lack of clearance between probe and the workpiece. It is also desirable to minimise the possibility of fracture and shipping of the workpiece upon breakthrough of the probe and this may be obtained by ensuring that the tool feed rate equates with the rate of material removal.

It is an object of the present invention to provide an ultrasonic machining apparatus having an improved form of feed rate control.

According to the invention an ultrasonic machining apparatus comprises an abrasive impregnated tool, an ultrasonic generator to activate the tool, means for rotating the tool relative to a workpiece and means to feed the tool towards the workpiece at a rate proportional to the rate of material removal from the workpiece.

Preferably the tool and ultrasonic transducer unit are moveable vertically and counter balanced by a mass supported on a piston, fluid pressure means being provided to support and move said piston in a controlled manner.

The piston comprises a disc arranged as a loose sliding fit in a cylindrical bore and the fluid pressure means include a pump incorporated in a fluid circuit supplying fluid to the underside of the piston and a pressure control valve arranged to control a fluid bleed from the circuit.

To enable the nature of the invention to be more easily understood one embodiment of the invention will now be described by way of example with reference to the accompanying drawings. In the drawings FIG. 1 is a cutaway view of an ultrasonic machining head, FIG. 2 is a somewhat diagrammatic view of an ultrasonic machine tool illustrating the feed control system, and FIGS. 3 to 10 show various forms of tool bits suitable for ultrasonic machining operations.

The machine tool comprises an ultrasonic machining head mounted for vertical movement above a compound slide work table. The tool is mounted on a cabinet which houses an ultrasonic generator, control gear, hydraulic tank and pumps.

The ultrasonic machining head comprises a crystal type ultrasonic transducer and a sonic converter rotatably supported with an elongate cylindrical housing 1. The transducer and converter are together rotated by an electric motor 2, the unit being driven through a dog coupling 3 secured to the end of the motor shaft.

Figure 2:
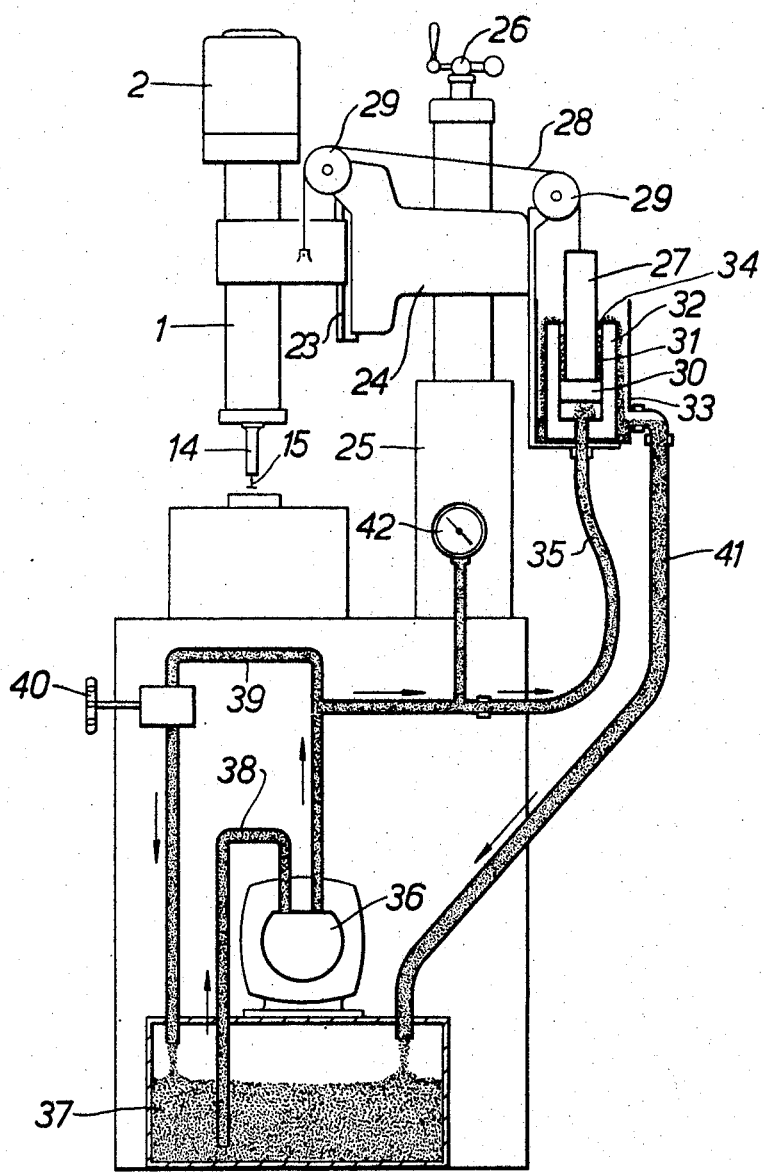

Referring, particularly to FIG. 1 the transducer is housed within a cylindrical casing 4 secured on an ebonite driving shaft 5 by means of a flanged member 6 formed integrally with the shaft 5. A series of four copper slip rings 7 separated from each other by insulating spacers 8 are mounted on and around the shaft 5 adjacent to the flange 6. Electrical leads 9 are connected individually to the under surface of each of the slip rings 7 and each lead passes along a separate passageway formed in the shaft 5 to the interior of the casing 4. The shaft 5 is stepped down to a smaller diameter beyond the slip rings 7 and spacers 8 and a ball race assembly 10 is fitted between the last spacer and a bush 11.

The sonic converter 12 is secured to the free end of the transducer casing and the outer end of the converter 12 has a portion 14 of reduced diameter. The end of section 14 is provided with a threaded bore into which a variety of different abrasive tools 15 may be fitted.

Within the transducer casing 4 a crystal ultrasonic transducer generally indicated by the numeral 55, is secured to the converter 12 in a known manner, such as for example by bonding, or is bolted thereto, whereby in operation the transducer sets up resonance in the converter 12. The transducer 55 is supported in the casing 4 by a flanged member 56 which is provided with holes 57 for the passage of cooling air therethrough. A cooling motor 58 and fan 60 are also located within the casing 4, the cooling motor 58 being mounted on the flanged member 6 and secured thereto by bolts 59. The fan 60 is secured to a shaft 61 which is driven by the motor 58 and is located in the region of a series of ports 16 in the casing 4. There is no driving connection between the fan and the transducer. Two of the leads 9 are connected to the cooling motor and the other two leads 9 pass to the transducer.

A ball race 17 rotatably supports the converter 12 at a position which corresponds to a position of minimum vibration of the converter 12 when in use. The ball race 17 is located within the end of housing 1 by a threaded end cap 18 and the other end of housing 1 is brazed to an externally flanged member 19. Member 19 is fitted to the casing of the motor 2 by means of four screws 20 spaced equally around the flange.

The housing 1 is provided with a first series of ports 21 which are in alignment with the ports 16 in the transducer casing 4. A second series of ports 22 are provided in the housing 1 at a position which corresponds to a position of maximum vibration of the sonic converter.

A four pin plug socket 42 is fitted to an extension of the motor casing and each pin of the socket is electrically connected to its corresponding slip ring through four conventional spring loaded brush assemblies 43.

The generator converts an electrical input of 200–250 volts at 56–60 cycles/sec. to ultrasonic power at 20 kc./sec. providing an average electrical output of 100 w. with a 200 w. peak. The amplitude ranges from 0.00025 to 0.0005 in. Using a calibrated step switch the power output of the generator can be set at eight different levels between 0 and 100 w. A tuning control and ammeter permit easy adjustment to the most efficient frequency for machining.

The machine head and drive motor assembly is mounted on a linear ball slide 23 secured to a head bracket 24 of a conventional pillar type drill stand 25. The bracket is moveable up and down the pillar upon rotation of handle 26 in the normal manner. The head is counter balanced by a mass 27 attached to the head by a flexible cable 28. The cable passes over guide pulleys 29 journalled on projecting portions of the bracket. The counter balancing mass 27 is approximately 5 to 8 lbs. heavier than the head and comprises a cylindrical lead weight and a piston 30. The piston, in the form of a disc having a diameter larger than the lead weight is a loose sliding fit within a cylindrical bore 31 formed in a housing 32. The housing 32 is in turn enclosed within a tank like casing member 33 secured to the head bracket 24. A spider member 34 located at the top of the cylindrical bore ensures centralization of the lead weight in relation to the bore. In the appartatus described in the lead weight is 2.5" dia. and the piston 3" dia.

The lower end of the bore connects with a hydraulic supply system via a fluid line 35. The hydraulic system comprises a fluid pump 36 and a reservoir 37. The pump is connected to the reservoir via an inlet line 38 and discharges back to the reservoir via an outlet line 39. The rate of fluid discharge is controlled by a valve 40 located in line 39. Fluid line 35 connects with line 39 and supplies fluid to the underside of the piston. The fluid bleeds past the piston and discharges out of the top of the cylinder into the casing member 33 and returns via a line 41 to the reservoir. A pressure gauge 42 is provided in line 35 to facilitate correct adjustment of valve 40 and the fluid lines 35 and 41 are of flexible construction to permit vertical adjustment of the head bracket 24.

In operation the pumping unit supplies fluid, in the form of a light mineral oil, at pressures up to 60 p.s.i. to the volume under piston 30. The fluid pressure is regulated by valve 40 until the pressure is just sufficient to support the counter balancing mass. By further adjustment of valve 40 the tool head may be lowered at a rate related to the rate of material removal desired for a particular workpiece taking into account the tool area in contact with the workpiece.

The provision of a constant fluid bleed past the piston reduces any tendency to erratic movement of the piston and weight and prevents local pressure build up at the tool faces ensuring a uniform cutting rate throughout the machining operation.

Using suitable tools the machine may be used to perform drilling, milling and screw-threading operations on materials such as glass, alumina and nuclear ceramics.

In general, each tool is of circular cross section, machined from steel bar and shaped to suit the desired form of machining operation. The tool may be provided with a hollow or solid stem 51 and the upper end 52 of the stem is screw-threaded to interconnect with a threaded bore in the ultrasonic transducer horn. Each stem is provided with a shoulder portion 53 adapted to abut the horn. After the shaping operation, the tip or cutting surface 54 on each tool is impregnated with a diamond abrasive, preferably by electrodepositing a layer of diamond dust approximately 0.005 in. thick on the said surface.

Figures 3, 4, 5, 6:
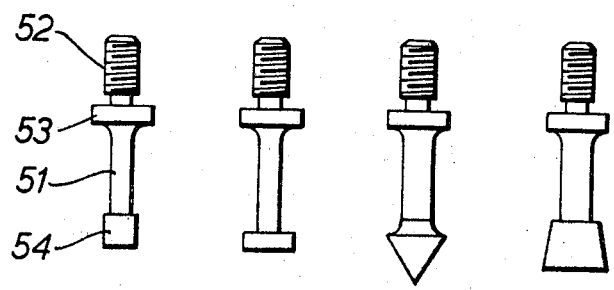
Figures 7, 8, 9, 10:
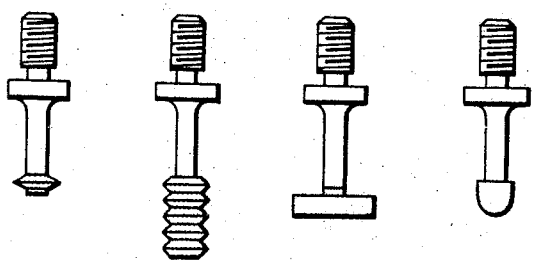

FIG. 3 shows a tool suitable for drilling and, if hollow, trepanning operation, FIGS. 4 and 5 illustrate tools which may be used in milling operations in forming T-shaped or dovetail grooves. FIG. 6 shows a tool used to form V-shaped grooves or as a counter sinking tool. FIGS. 7 and 8 illustrate single and multiple thread forming tools, the thread forms being machined to suit the angle of the thread to be cut. FIG. 9 shows a facing tool and FIG. 10 a tool to provide holes or grooves having rounded bottoms.

Using the apparatus accurately sized holes from 0.040 in. to 0.500 in. diameter with depths extending to 1 in. may be drilled into glass and various nuclear ceramics without difficulty. For example, ⅜ in. diameter holes were drilled cleanly through ⅜ in. thick glass sheet using a diamond impregnated hollow tool revolving at 1100 r.p.m. and operating at maximum transducer frequency. The hydraulic pressure was adjusted to 3 p.s.i. and time taken 1 minute.

Drilling trials have also been conducted on ⅛ in. thick piece alumina. Using diamond impregnated hollow drills in the ⅛ to ½ inch. diameter range, operating at maximum transducer frequency and the hydraulic system pressurised at 4 p.s.i., the most efficient drilling speed is 1000 r.p.m. Under these conditions the ⅛ in. thick alumina was penetrated in ½ min./per hole irrespective of the drill size in this range. Using smaller solid diamond impregnated drills ranges from 0.040 in. to 0.080 in. diameter, the drilling time increased to 1½ min./per hole.

In a further drilling test 7/16 in. diameter holes were drilled through ½ in. thick alumina in 5 mins. using a diamond impregnated hollow drill rotational speed 1000 r.p.m., hydraulic pressure 4 p.s.i. and maximum transducer frequency.

I claim:

1. An ultrasonic machining apparatus comprising an abrasive impregnated tool, an ultrasonic generator to ultrasonically vibrate the tool, means for rotating the tool relative to a workpiece, said tool being counter balanced by a piston moveable in a bore, and a fluid pressure means to support and move said piston selectively to move the said tool in a controlled manner.

2. An ultrasonic machining apparatus according to claim 1 wherein the piston comprises a disc arranged as a loose sliding fit in a cylindrical bore and the fluid pressure means include a pump incorporated in a fluid circuit supplying fluid to the underside of the piston and a pressure control valve to regulate a fluid bleed from the circuit.

3. An ultrasonic machining apparatus wherein a machine head comprises an ultrasonic transducer, a sonic converter assembly and a tool operatively associated with the ultrasonic transducer and the sonic converter assembly for movement therewith, means to rotatably support the assembly and drive means to rotate the assembly and the tool, said head being slidably mounted on a support stand, workpiece locating means associated with the stand, fluid pressure means to cause movement of the head relative to the workpiece locating means and hence move the tool in a controlled manner, and fluid pressure control means to vary the rate of movement of the said machine head.

4. An ultrasonic machining apparatus according to claim 3 wherein the sonic converter is apertured to receive the elongate shank portion of the tool, said tool having a tip portion shaped to provide cutting surfaces said surfaces being impregnated with a diamond abrasive.

5. An ultrasonic machining apparatus according to claim 3 wherein the head is mounted for vertical movement above the workpiece locating means and movement of the head is counter balanced by a mass supported on a piston, said fluid pressure means supporting said piston.

6. An ultrasonic machining apparatus according to claim 4 wherein the piston is a loose sliding fit in a cylindrical bore and the fluid pressure means include a pump incorporated in a fluid circuit supplying fluid to the under side of the piston and a pressure control valve regulates a fluid bleed from the circuit.

7. An ultrasonic machining apparatus according to claim 5 wherein said sonic converter is supported at a position corresponding to the position of minimum vibration at operating frequencies.

8. Apparatus according to claim 6 wherein the ultrasonic transducer is enclosed within a casing and forced cooling means are provided to the interior of the casing.

9. Apparatus according to claim 7 wherein the cooling means includes a fan located within said casing.

10. Apparatus according to claim 8 wherein power is supplied to the transducer via a slip ring and brush assembly.

References Cited

UNITED STATES PATENTS

| | | | |
|---|---|---|---|
| 2,790,066 | 5/1957 | Mahlmeister | 51—59 |
| 2,831,295 | 4/1958 | Weiss | 51—59 |
| 2,991,594 | 7/1961 | Brown et al. | 51—59 |
| 3,015,914 | 1/1962 | Roney | 51—59X |

FOREIGN PATENTS 987,801  3/1965  Great Britain.

LESTER M. SWINGLE, Primary Examiner

U.S. Cl. X.R.

51—59; 77—36